Feb. 3, 1959 — O. WOODRING — 2,872,504
ELECTRIC OUTLET BOX
Filed Feb. 28, 1956
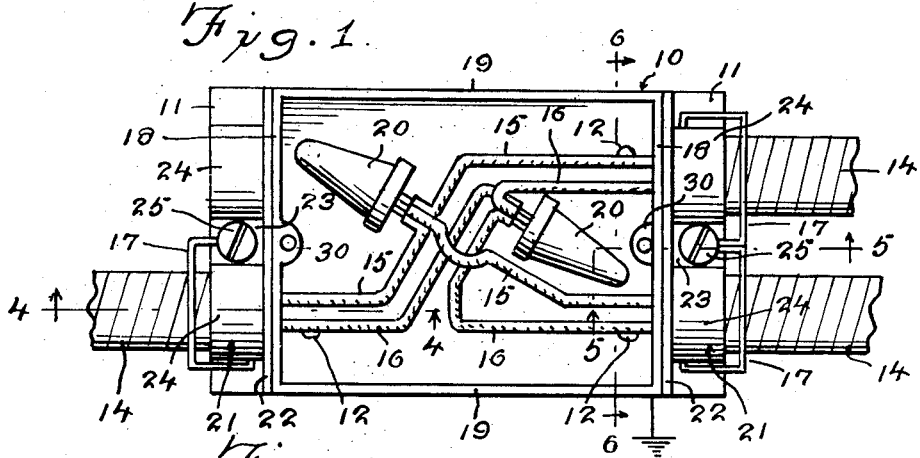
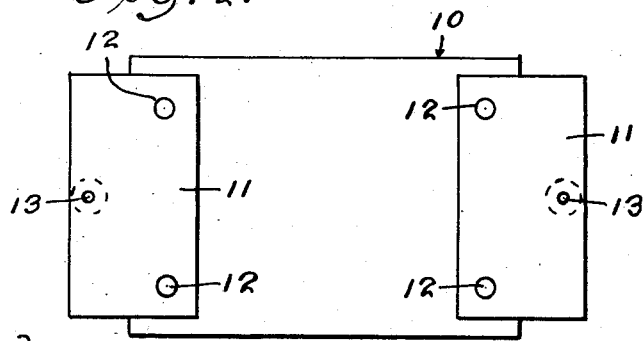
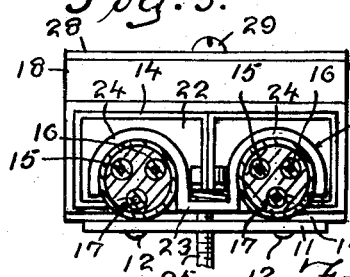 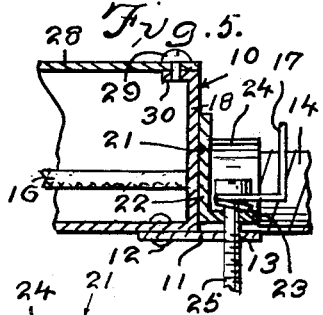
INVENTOR.
Otto Woodring
BY Victor J. Evans & Co.
ATTORNEYS

United States Patent Office 2,872,504
Patented Feb. 3, 1959

2,872,504

ELECTRIC OUTLET BOX

Otto Woodring, Meadville, Pa.

Application February 28, 1956, Serial No. 568,344

3 Claims. (Cl. 174—65)

This invention relates to electrical equipment, and more particularly to an electric outlet box.

The object of the invention is to provide an electric outlet box which is constructed so that access can be readily had to the various parts thereof.

Another object of the invention is to provide an electric outlet box which is constructed so that the cables are connected to the box through the medium of clamps which are arranged exteriorly of the box and whereby ground wires of the cables are connected to the box at a point outside of the box or housing whereby the parts can be more easily handled or manipulated.

A further object of the invention is to provide an electric outlet box which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a plan view of the electric outlet box, with the cover removed.

Figure 2 is a bottom plan view of the electric outlet box of the present invention.

Figure 3 is a sectional view taken through the cables and illustrating the outlet box.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

Figure 7 is an elevational view of one of the clamps.

Referring in detail to the drawings, the numeral 10 designates a housing or box which may be of rectangular shape, and secured to the bottom of the box are a pair of spaced apart bases or plates 11, Figure 2. The bases 11 may be secured to the bottom of the box 10 through the medium of suitable securing elements 12, and each of the bases 11 is provided with a threaded aperture 13 for a purpose to be later described. The numeral 14 designates the usual cables which lead to the box 10, and the cables 14 may be provided with three wires 15, 16 and 17, and one of the wires such as the wire 17 may be a ground wire.

The box or housing 10 is hollow and includes spaced parallel end walls 18 and spaced parallel side wall 19, and connectors 20 may be arranged in engagement with certain of the wires as shown in Figure 1.

Arranged contiguous to each of the end walls 18 is a clamp which is indicated generally by the numeral 21, and each clamp 21 includes a plate 22 which abuts the end wall 18. Extending outwardly from each of the plates 22 and secured thereto or formed integral therewith is a web 23 which has a pair of arcuate portions or sections 24 extending therefrom. The arcuate sections 24 engage or clamp the cables 14 in place. A securing element such as a bolt 25 extends through the web 23, and the bolt 25 engages the threaded aperture 13 in the base 11. The plates 22 of the clamps 21 are provided with apertures 26 which may be arranged in pairs, as shown in Figure 7, and these pairs of apertures 26 register with the knock-out openings 27 in the end walls 18 so that the wires 15 and 16 can extend through the apertures 26 and through the openings 27 into the interior of the housing 10. The ground wires 17 are adapted to be stripped or made bare of insulation as shown in Figure 1, and the ground wires 17 are adapted to be arranged in engagement with the bolts 25.

The housing 10 may include the usual cover plate 28 which can be secured in place by securing elements 29 which engage apertured lugs or ears 30, Figures 4 and 5.

From the foregoing, it is apparent that there has been provided an outlet box which is constructed so that the cables such as the cables 14 are clamped to the outlet box through the medium of connections which are arranged on the outside of the box. Also, the ground wires 17 are secured to the bolts 25 at a point outside of the box or housing 10 and by having the various connections exteriorly of the housing, access to the connections is easier than if the connections are arranged within the box or housing.

In use, the clamp 21 includes a pair of arcuate portions 24 which straddle or engage the cables 14 so that by tightening the bolt 25, the clamp 21 will maintain or hold the cables 14 in place. As shown on the right hand side of Figure 1 two of the cables 14 may be clamped in place, and as shown on the left side of Figure 1, if desired, only one of the cables 14 can be used with the present invention. The ground wires 17 are adapted to have the insulation stripped or removed therefrom, and these ground wires 17 are arranged in engagement with the bolts 25 which connects the clamp 21 to the base 11, the bolt 25 extending through the web 23 of the clamp and the bolt 25 threadedly engaging the aperture 13 in the base 11. The plate 22 of the clamp 21 is provided with apertures 26 which are arranged in pairs as shown in Figure 7, and these pairs of apertures 26 register with the openings 27 in the end walls 18 of the housing so that the two wires 15 and 16 of each cable 14 can extend through these apertures and into the interior of the housing as shown in Figure 1.

It is to be understood that the number of wires or cables can be varied as desired. The plates 22 cover that portion of the knock-out holes 27 which are not used by the wires 15 and 16. The clamps can be secured in place in any desired manner and the clamps are arranged on the outside of the box or housing. With the present invention, the attachment of the ground wires to the bolts 25 is more easily accomplished than if the ground wires were arranged within the housing. The head of the bolts 25 is of such a size that it fits between the pair of arcuate portions 24 of the clamp 21. The bases 11 can be secured to the box 10 in any suitable manner. With the present invention, installation of electrical equipment will be speeded up and facilitated and the arrangement of the present invention can be used on electric outlet boxes of different sizes and shapes. Also, by having the connections on the outside of the box, an electrical inspector can more easily see or observe where the connections have been properly made.

I claim:

1. In an electric outlet box, a bottom wall, a pair of spaced apart bases secured to the outer surface of said bottom wall and extending beyond the ends of said bottom wall, there being a threaded aperture in each of said bases, the ends of the outlet box being provided with a plurality of circular openings, a clamp arranged contiguous to each end of the outlet box and including a vertically disposed plate, said plates being provided with apertures arranged in pairs and registering with the openings in the ends of the outlet box, a body member extending outwardly from said plate and including a flat web, a securing element extending through said web and engaging the apertures in said bases, and a pair of arcuate sections extending from said web.

2. In an electric outlet box, a bottom wall, a pair of spaced apart bases secured to the outer surface of said bottom wall and extending beyond the ends of said bottom wall, there being a threaded aperture in each of said bases, the ends of the outlet box being provided with a plurality of circular openings, a clamp arranged contiguous to each end of the outlet box and including a vertically disposed plate, said plates being provided with apertures arranged in pairs and registering with the openings in the ends of the outlet box, a body member extending outwardly from said plate and including a flat web, a securing element extending through said web and engaging the apertures in said bases, and a pair of arcuate sections extending from said web, cables engaging said arcuate sections and interposed between said arcuate sections and bases, said cables each including three wires, one of which is a ground wire, said ground wire being connected to said securing elements, and the other two wires extending through the apertures in said plates and through the openings in the ends of the outlet box.

3. In an electric outlet box, a bottom wall, a pair of spaced apart bases secured to the outer surface of said bottom wall and extending beyond the ends of said bottom wall, there being a threaded aperture in each of said bases, the ends of the outlet box being provided with a plurality of circular openings, a clamp arranged contiguous to each end of the outlet box and including a vertically disposed plate, said plates being provided with apertures arranged in pairs and registering with the openings in the ends of the outlet box, a body member extending outwardly from said plate and including a flat web, a securing element extending through said web and engaging the apertures in said bases, and a pair of arcuate sections extending from said web, cables engaging said arcuate sections and interposed between said arcuate sections and bases, said cables each including three wires, one of which is a ground wire, said ground wire being connected to said securing elements, and the other two wires extending through the apertures in said plates and through the openings in the ends of the outlet box, said clamps being arranged exteriorly of said housing, and the connection of said ground wires to said securing elements being outside of said housing.

References Cited in the file of this patent
UNITED STATES PATENTS

| | | |
|---|---|---|
| 1,032,058 | Gilson | July 9, 1912 |
| 2,211,929 | Hallberg | Aug. 20, 1940 |
| 2,242,290 | Dember | May 20, 1941 |
| 2,684,994 | Kwake | July 27, 1954 |